US005698305A

United States Patent [19]

Suzuki et al.

[11] Patent Number: 5,698,305

[45] Date of Patent: Dec. 16, 1997

[54] NEWSPRINT PAPER

[75] Inventors: Mamoru Suzuki; Junko Furuhata; Motoi Fukuda, all of Tokyo; Satoshi Hatano, Kushiro; Toshiyuki Takano, Tokyo; Hiroaki Umeda, Iwaki; Hazimu Hashimoto, Akashi, all of Japan

[73] Assignees: Nippon Paper Industries Co., Ltd., Tokyo; Seiko Chemical Industry Co., Ltd., Akashi, both of Japan

[21] Appl. No.: 459,798

[22] Filed: Jun. 2, 1995

[30] Foreign Application Priority Data

Jun. 3, 1994 [JP] Japan .................................... 6-122477

[51] Int. Cl.$^6$ ...................................................... B32B 27/10

[52] U.S. Cl. ................... 428/219; 525/328.4; 525/329.2; 525/329.4; 525/355; 162/164; 427/146; 427/363

[58] Field of Search .............................. 525/328.4, 329.2, 525/329.4, 355; 162/164; 428/219; 427/146, 363

[56] References Cited

FOREIGN PATENT DOCUMENTS 49-0113407 1/1974 Japan .

*Primary Examiner*—Richard Weisberger
*Attorney, Agent, or Firm*—Sherman and Shalloway

[57] ABSTRACT

A newsprint paper coated with a surface treating agent including a polyacrylamide-based compound and a vinyl acetate/maleic acid half ester copolymer in an coating amount of 0.01 to 0.2 g/m$^2$. By coating the surface treating agent which is capable of obtaining well-balanced surface strength and peeling strength, lightweight newsprint paper or high recycled pulp content newsprint paper suitable for offset printing can be obtained.

3 Claims, No Drawings

NEWSPRINT PAPER

1. Field of the Invention

This invention relates to a newsprint paper which is improved in terms of surface strength and the like.

2. Background of the Invention

Newsprint paper, in general, is a paper based mainly on mechanical pulp or deinked pulp (hereinafter referred to as DIP). Although it is classified in the middle- or low-graded paper, newsprint paper is required to be positively printed in a specified amount within a predetermined length of time of a predetermined time zone, and to have a stricter quality over general-purpose print paper. From this point, newsprint paper is a special paper, and is thus independently classified in the classification of paper.

Recent newsprint paper is required to be lightweight and to have a high content of DIP and, overcoming such adverse requirements, it is necessary to achieve various improvements. From such point of view, improvement of newsprint paper is somewhat of a different dimension from improvement of general print paper.

Recently, newspaper printing system is rapidly shifting from relief printing to offset printing for meeting various requirements (e.g. high-speed printing, colorprint, multi-quality printing, automation) as well as introduction of a computer system in newspaper printing.

The popularization of offset printing requires newsprint paper to have quality different from that for relief printing. For example, such quality includes (1) wet strength, and no breaking due to wetting, (2) appropriate water absorption, and (3) no occurrence of paper duct. Of these quality requirements, improvement of the surface strength including the solution of the paper dust problem is particularly important.

On the other hand, as a major trend of newsprint paper itself, there is a trend towards lightweight newsprint paper and high content of DIP.

As to lightweight newsprint paper, for example, in Japan, whereas in 1989 use of newsprint paper with a substance of 46 $g/m^2$ accounted for 96%, in 1993 use of newsprint paper with a substance of 43 $g/m^2$ accounts for about 80%. With such a trend towards lightweight newsprint paper, problems are occurring such as reduction of opacity and paper strength. To compensate for such reduction of opacity and paper strength, it is required to add large amounts of inorganic or organic filler and pigments. However, if large amounts of fillers and pigments are used, since the paper itself is thin and lightweight, these fillers and pigments cannot be stably fixed in the paper, and are liable to separate. Particularly in offset printing which uses wetting water, interfibrous bonding of pulp is relaxed due to the wetting water, resulting in considerable separation of aggregates. These problems become serious with the trend towards lightweight newsprint paper. For example, improvement of newsprint paper with a substance of less than 46 $g/m^2$ is far difficult than improvement of newsprint paper with a substance of more than 46 $g/m^2$. On the other hand, a high content of DIP results in increases in DIP-originated fine fibers and DIP-originated fillers and pigments. Increases in these ingredients lead to such problems as occurrence of paper dust, reduction in paper strength, and the like. These problems increase and become considerable as the content of DIP increases. Such a trend of newsprint paper is now a serious negative factor, especially, in terms of surface strength.

Methods of improving the surface strength of newsprint paper are broadly divided into a coating measure and a non-coating measure.

The non-coating measure further includes modification of the material composition, modification of sheeting condition, an increased use of an paper strength improving agent, and the like. However, mere use of these methods is now difficult to meet strict requirements for newsprint paper for offset printing. For example, in color printing by offset printing, as compared to black-and-white printing, frequency of contact between newsprint paper and the printing head increases, or effects on newsprint paper become considerable due to an increase in transfer of wetting water, and it is practically difficult to deal with these problems.

On the other hand, in measures by coating, a surface treating agent such as starch, modified starch (oxidized starch, starch derivatives, etc.) and polyvinyl alcohol (hereinafter abbreviated to as PVA) and the like is coated on the surface of newsprint paper (externally added), which is an effective means for improving the surface strength.

However, as described above, the advance in lightweight newsprint paper or high DIP content is a negative factor in view of the surface strength, and it becomes necessary to increase the coating amount of the surface treating agent. However, when large amounts of surface treating agents such as starches and PVA are used, since the surface treating agents show stickiness when wetted with water, they tend to cause troubles due to stickiness during the production of newsprint paper or printing (so-called "blocking trouble"). Therefore, in taking measures by coating, it is important not only to simply improve the surface strength, but also to improve such stickiness, that is, to improve the peeling strength, and it is important to achieve a good balance between both properties (surface strength and peeling strength).

Simple coating newsprint paper with starch, modified starch or PVA has a problem in the peeling strength.

To solve the problem of blocking trouble, for example, Japanese Patent Laid-open Publication 05-59689 discloses a newsprint paper which is surface sized by coating a composition comprising PVA and a block copolymer of ethyleneoxide and propyleneoxide, to provide newsprint paper having an improved surface strength and low in stickiness during offset printing. This method has an improved peeling strength compared with simple coating with starches or PVA, but for further lightweight and low-cost requirements, it has been difficult to obtain satisfactory surface strength and peeling strength.

Further, Japanese Patent Laid-open Publications (OPIs) 06-57688 and 06-192995 disclose antistick agents for improvement of peeling strength along with surface strength. Japanese OPI 06-57688 discloses an antistick agent which comprises an organic fluorine compound, and Japanese OPI 06-192995 discloses one which comprises a substituted succinic acid and/or a substituted succinic acid derivative. However, the use of these antistick agents has disadvantages such as (1) foaming trouble during coating, and (2) an increase in cost.

Therefore, a primary object of the present invention is to provide a newsprint paper having a low substance of less than 48 $g/m^2$, which has well-balanced surface strength and peeling strength and, in particular, is suitable for offset printing.

SUMMARY OF THE INVENTION

The above object is attained by a newsprint paper coated on the surface with a surface treating agent comprising a polyacrylamide-based compound and a vinyl acetate/maleic acid half ester copolymer.

A surface treating composition comprising a polyacrylamide compound and a vinyl acetate/maleic acid half ester copolymer (the ratio of the polyacrylamide and the copolymer being 95:5 to 70:30) is disclosed in Japanese Patent Publication 50-19962. However, this surface composition is for general-purpose print paper, but is not for newsprint paper. The Publication describes an example that this surface treating composition is coated on a fine paper of 80 $g/m^2$ in a coating amount of 0.64 $g/m^2$ by a normal coater.

Generally, the surface treatment of a fine paper is done by a normal coater such as a 2-roll size press. In the coating by this type of coater, a surface treating composition penetrates into the paper considerably. Therefore, the peeling strength of a treated paper is not high and need not to be considered.

On the other hand, the surface treatment of a newsprint paper is generally conducted by a special coater such as a gate-roll coater, because a newsprint paper is too weak to be passed through the pond of a surface treating agent on a 2-roll size press. In the coating by the special coater, a surface treating agent almost remains on the surface of a paper. And then, the coated newsprint paper of this surface treating composition of 0.64 $g/m^2$ by a gate-roll coater tends to have a very poor peeling strength and cause blocking trouble.

The inventors have found that, for newsprint paper, the ratio of the polyacrylamide-based compound and the vinyl acetate/maleic acid half ester copolymer and the coating amount of the polyacrylamide-based compound and the vinyl acetate/maleic acid half ester copolymer are important, and well-balanced surface strength and peeling strength can be obtained only when the above values are within specific ranges, and accomplished the present invention.

In accordance with the present invention, there is provided a lightweight newsprint paper with a substance of less than 46 $g/m^2$ coated on the surface with a surface treating agent comprising a polyacrylamide-based compound (hereinafter referred to as "component A") of Formula (1) and a vinyl acetate/maleic acid half ester copolymer (hereinafter referred to as "component B"), characterized in that a radio of the component A and component B is A:B=97:3 to 80:20 and a coating amount of the surface treating agent is 0.01 to 0.20 $g/m^2$.

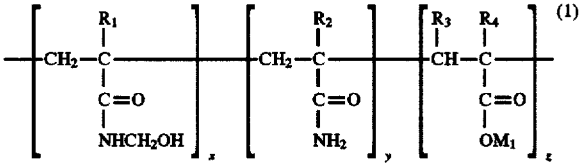

(1)

(wherein $R_1$ and $R_2$ denote methyl group or hydrogen atom. $R_3$ denotes methyl group, hydrogen atom, or —C(=O)$OM_A$, and $R_4$ denotes methyl group, hydrogen atom, or —$CH_2COOM_B$. $M_1$, $M_A$, and $M_B$ are hydrogen atom, alkali metal atom, $NH_4$, or $NH_4$ of which one or more of the four hydrogen atoms are substituted with substituted or unsubstituted alkyl groups of 1 to 20 carbon atoms or substituted or unsubstituted aryl groups of 6 to 20 carbon atoms. x, y, and z are integers wherein $0 \leq [x/(x+y+z)] \times 100 \leq 20$ (mole %), $60 \leq [y/(x+y+z)] \times 100 \leq 97$ (mole %), and $3 \leq [z/(x+y+z)] \times 100 \leq 20$ (mole %)),

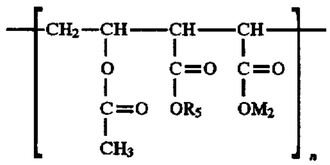

(2)

(wherein $R_5$ is a substituted or unsubstituted alkyl group of 1 to 25 carbon atoms, or a substituted or unsubstituted aralkyl group of 7 to 25 carbon atoms. $M_2$ denotes hydrogen atom, alkali metal atom, $NH_4$, or $NH_4$ of which one or more of the four hydrogen atoms are substituted with substituted or unsubstituted alkyl groups of 1 to 20 carbon atoms or substituted or unsubstituted aryl groups of 6 to 20 carbon atoms. n is an integer of 2 or more.).

In general, various types of polyacrylamide-based compounds are used in the area of paper-making. For example, the compounds are briefly described in "Chemical Dictionary of Paper and Processing", Techtimes, 1991, p241–249, and the like. Main applications of the polyacrylamide-based compounds are freeness/retention improver or paper strength improver, which are mainly used as internal addition chemicals. Japanese Patent Laid-open Publication 55-96915 discloses newsprint paper using a polyacrylamide-based compound as an internal addition chemical. These chemicals are considered to form ionic bond with pulp fibers or fillers caused by the ionic nature of the polyacrylamide-based compounds or hydrogen bond between the amide group of the polyacrylamide-based compounds and hydroxyl groups of the pulp fibers. However, even if the polyacrylamide-based compound, which is used for the above purpose, is coated on newsprint paper, no satisfactory result is obtained because of blocking or the like since the chemical is not designed for improving the peeling strength.

The surface treating agent of the present invention comprises the component A and the component B. The component A is a polyacrylamide-based compound of Formula (1) which is not a homopolymer of simple polyacrylamide consisting only of the amide structure of Formula (4) but, in addition to the amide structure, is a copolymer having an N-methylol structure of Formula (3) and an acrylic acid (salt) structure (hereinafter the acrylic acid (salt) structure is referred to an acrylic acid structure or an acrylic acid salt structure) of Formula (5).

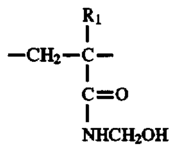

(3)

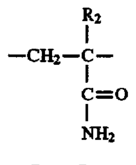

(4)

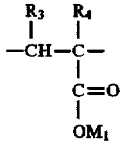

(5)

(wherein $R_1$ and $R_2$ denote methyl group or hydrogen atom. $R_3$ denotes methyl group, hydrogen atom, or —C(=O)$OM_A$, $R_4$ denotes methyl group, hydrogen atom, or —$CH_2COOM_B$, and $M_1$, $M_A$, and $M_B$ are hydrogen atom, alkali metal atom, $NH_4$, or $NH_4$ of which one or more of the four hydrogen atoms are substituted with substituted or unsubstituted alkyl groups of 1 to 20 carbon atoms or substituted or unsubstituted aryl groups of 6 to 20 carbon atoms.).

The ratio of the individual ingredients of the component A used in the present invention, where the component A has x units of N-methylol structure, y units of the amide structure, and z units of the acrylic acid (salt) structure, and the ratios of the individual ingredients are X, Y, and Z, X, Y, and Z are within the ranges of $X=[x/(x+y+z)]\times 100=0-20$ (mole %), $Y=[y/(x+y+z)]\times 100=60-97$ (mole %), and $Z=[z/(x+y+z)]\times 100=3-20$ (mole %).

The N-methylol structure, for example, when used by internal addition, is cross-linked by an acid or heat to endow the paper with a wet strength, but is also possible to give a strength when coated on the surface. In view of the shelf life of the coating solution, it is not preferable to increase the ratio (X) of the N-methylol structure to higher than 20 mole % which may have a problem. Further, depending on the properties required for newsprint paper, X may be 0 mole %. In this case, since the component A comprises only two ingredients of the amide structure and the acrylic acid (salt) structure, it is advantageous in terms of the production cost over the case of three ingredients. In view of the shelf life and the cost of the coating solution, it is further preferable that the ratio of the N-methylol structure is 0 to 10 mole %. Further, as far as the ratio of the N-methylol structure is within the above range, two or more different types of N-methylol structures (for example, N-methylol acrylamide structure and N-methylol methacrylamide structure) may exist in the molecule.

Since the acrylic acid (salt) structure is liable to be fixed with aluminum atom coming from aluminum sulfate, it serves to prevent penetration of the polyacrylamide-based compound into the paper and retain the compound on the paper surface. If the ratio (Z) of the acrylic acid (salt) structure is less than 3%, it has no effect to retain the polyacrylamide-based compound on the paper surface. If the ratio is larger than 20%, since the ratio of the amide structure becomes small, the effect to increase the surface strength is reduced. Further, similar to the N-methylol structure, two or more different types of acrylic acid (salt) structure may exist within the predetermined range. For the acrylic acid salt structure, for example, an alkali metal (lithium, sodium, potassium, rubidium, and the like) salt of acrylic acid, ammonium salt of acrylic acid (in Formula (5), M is ammonium ion or one or more hydrogen atoms of the ammonium ion are substituted with substituted or unsubstituted alkyl groups of 1 to 20 carbon atoms and/or substituted or unsubstituted aryl groups of 6 to 20 carbon atoms) can be used. Of these, in view of the production cost, the sodium salt, potassium salt, and unsubstituted ammonium salt (M is ammonium ion) are more preferable.

The amide structure can largely contribute in itself to improvement of the surface strength. The ratio (Y) of the amide structure is determined by X and Z, and is preferably 60 to 97 mole %, more preferably 80 to 95 mole %. Also for the amide structure, two or more different types of amide structure may exist in the molecule within the specified range.

Anyway, it is important that the ratios of the individual ingredients of the component A are well balanced according to the properties required for the newsprint paper produced. Distribution of the individual ingredients of the component A used in the present invention, though depending on the production method, may be of a block copolymer or a random copolymer. Further, in view of the properties of the coating solution or the coated newsprint paper, molecular weight of the component A of the present invention is preferably 50,000 to 1,500,000, the most preferably 50,000 to 500,000.

The component A used in the present invention can be produced, for example, by conventional methods known in the art in which a polymer or copolymer of acrylamide is reacted with formaldehyde under an alkaline condition to partially introduce the N-methylol structure, partial hydrolysis of a polymer or copolymer of acrylamide, or direct copolymerization of acrylamide, N-methylol acrylamide, acrylic acid/acrylic acid salt. These methods can be used alone or in combination.

The component A used in the present invention specifically includes a copolymer of (meth)acrylamide (hereinafter (meth)acrylamide is referred to acrylamide and/or methacrylamide)/N-methylol (meth)acrylamide/(meth) acrylic acid (hereinafter (meth)acrylic acid is referred to acrylic acid and/or methacrylic acid); a copolymer of (meth) acrylamide/N-methylol (meth)acrylamide/alkali metal salt (sodium and/or potassium salt) of (meth)acrylamide; a copolymer of (meth)acrylamide/N-methylol (meth) acrylamide/ammonium salt of (meth)acrylic acid; a copolymer of (meth)acrylamide/N-methylol (meth)acrylamide/ alkylammonium salt (methylammonium salt, ethylammonium salt, butylammonium salt, and the like) of (meth)acrylic acid; a copolymer of (meth)acrylamide/N-methylol (meth)acrylamide/dialkylammonium salt (dimethylammonium salt), diethylammonium salt, dibutylammonium salt, ethylmethylammonium salt, and the like) of (meth)acrylic acid; a copolymer of (meth)acrylamide/N-methylol (meth)acrylamide/trialkylammonium salt (trimethylammonium salt, triethylammonium salt, tributylammonium salt, and the like) of (meth)acrylic acid; a copolymer of (meth)acrylamide/N-methylol (meth) acrylamide/tetraalkylammonium salt (tetramethylammonium salt, tetraethylammonium salt, tetrabutylammonium salt, and the like) of (meth)acrylic acid; a copolymer of (meth)acrylamide/N-methylol (meth) acrylamide/arylammonium salt (phenylammonium salt, toluylammonium salt, and the like) of (meth)acrylic acid; a copolymer of (meth)acrylamide/N-methylol (meth) acrylamide/diarylammonium salt (diphenylammonium salt, ditoluylammonium salt, and the like) of (meth)acrylic acid; a copolymer of (meth)acrylamide/N-methylol (meth) acrylamide/alkylarylammonium salt (methylphenylammonium salt, ethyltoluylammonium salt, and the like) of (meth)acrylic acid; a copolymer of (meth) acrylamide/N-methylol (meth)acrylamide/alkali metal salt (sodium and/or potassium salt) of (meth)acrylic acid; a copolymer of (meth)acrylamide/ammonium salt of (meth) acrylic acid; a copolymer of (meth)acrylamide/ alkylammonium salt (methylammonium salt, ethylammonium salt, butylammonium salt, and the like) of (meth) acrylic acid; a copolymer of (meth)acrylamide/ dialkylammonium salt (dimethylammonium salt, diethylammonium salt, dibutylammonium salt, ethylmethylammonium salt, and the like) of (meth)acrylic acid; a copolymer of (meth)acrylamide/trialkylammonium salt (trimethylammonium salt, triethylammonium salt, tributylammonium salt, and the like) of (meth)acrylic acid; a copolymer of (meth)acrylamide/tetraalkylammonium salt (tetramethylammonium salt, tetraethylammonium salt, tetrabutylammonium salt, and the like) of (meth)acrylic acid; a copolymer of (meth)acrylamide/arylammonium salt (phenylammonium salt, toluylammonium salt, and the like)

of (meth)acrylic acid; a copolymer of (meth)acrylamide/N-methylol (meth)acrylamide/itaconic acid; a copolymer of (meth)acrylamide/N-methylol (meth)acrylamide/alkali metal salt (sodium and/or potassium salt) of itaconic acid; a copolymer of (meth)acrylamide/N-methylol (meth) acrylamide/ammonium salt of itaconic acid; a copolymer of (meth)acrylamide/N-methylol (meth)acrylamide/crotonic acid; a copolymer of (meth)acrylamide/N-methylol (meth) acrylamide/alkali metal salt (sodium and/or potassium salt) of crotonic acid; a copolymer of (meth)acrylamide/N-methylol (meth)acrylamide/ammonium salt of crotonic acid; a copolymer of (meth)acrylamide/N-methylol (meth) acrylamide/fumaric acid; a copolymer of (meth)acrylamide/N-methylol (meth)acrylamide/alkali metal salt (sodium and/or potassium salt) of fumaric acid; a copolymer of (meth) acrylamide/N-methylol (meth)acrylamide/ammonium salt of fumaric acid; a copolymer of (meth)acrylamide/N-methylol (meth)acrylamide/(meth)acrylic acid/alkali metal salt (sodium and/or potassium salt) of (meth)acrylic acid; a copolymer of (meth)acrylamide/N-methylol (meth) acrylamide/(meth)acrylic acid/ammonium salt of (meth) acrylic acid; and a copolymer of (meth)acrylamide/N-methylol (meth)acrylamide/(meth)acrylic acid/itaconic acid; and the like.

The above copolymer may be copolymerized further with a small amount of another copolymerizable unsaturated monomer as far as the characteristics of the polyacrylamide-based compound of the present invention are not impaired. The copolymerizable unsaturated monomer includes alkyl-substituted acrylamide monomers such as N, N-dimethylacrylamide, N,N-diethylacrylamide, and N-isopropylacrylamide; alkyl (meth)acrylate monomers such as methyl (meth)acrylate (hereinafter (meth)acrylate is referred to acrylate and/or methacrylate), ethyl (meth) acrylate, n-propyl (meth)acrylate, 2-ethylhexyl acrylate; N,N-dialkylaminoalkyl (meth)acrylate monomers such as N,N-dimethylaminoethyl (meth)acrylate, and N,N-dimethylaminopropyl (meth)acrylate; N,N-dialkylaminoalkylacrylamide monomers such as N,N-dimethylaminomethyl (meth)acrylamide, N,N-diemethylaminoethyl (meth)acrylamide, N,N-diethylaminomethyl (meth)acrylamide, and N,N-diethyaminoethyl (meth)acrylamide; cross-linkable monomers such as N,N-methylene-bisacrylamide, glycidyl (meth)acrylate, and diethyleneglycol (meth)acrylate; sulfonic acid-based monomers such as 2-acrylamide-2-methylpropanesulfonic acid, styrenesulfonic acid, and vinylsulfonic acid; and monomers such as acrylonitrile, styrene, and vinyl acetate.

Further, in the present invention, as the component A, the above polyacrylamide-based compounds may be used alone or in combination as far as troubles such as gelation, thickening, or formation of insoluble coagulates are not caused.

The component B used in the present invention is a vinyl acetate/maleic acid half ester copolymer represented by Formula (2).

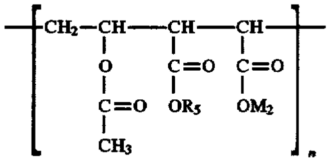
(2)

(wherein $R_5$ is a substituted or unsubstituted alkyl group of 1 to 25 carbon atoms, or a substituted or unsubstituted aralkyl group of 7 to 25 carbon atoms. $M_2$ is hydrogen atom, alkali metal atom, $NH_4$, or $NH_4$ of which one or more of the four hydrogen atoms are substituted with substituted or unsubstituted alkyl groups of 1 to 20 carbon atoms or substituted or unsubstituted aryl groups of 6 to 20 carbon atoms. n is an integer of 2 or more.).

Of the ingredients of the component B used in the present invention, the maleic acid half ester structure of Formula (6), similar to the acrylic acid (salt) structure in the component A, is liable to react with aluminum atom coming from aluminum sulfate, and is considered to contribute to prevention of the compound from penetrating into the paper layer and retain on the paper surface.

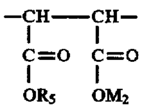
(6)

(wherein $R_5$ is a substituted or unsubstituted alkyl of 1 to 25 carbon atoms, or a substituted or unsubstituted aralkyl of 7 to 25 carbon atoms. $M_2$ is hydrogen, alkali metal atom, $NH_4$, or $NH_4$ of which one or more of the four hydrogen atoms are substituted with substituted or unsubstituted alkyls of 1 to 20 carbon atoms or substituted or unsubstituted aryls of 6 to 20 carbon atoms. n is an integer of 2 or more.).

The component B used in the present invention can be obtained by copolymerizing maleic acid half ester and vinyl acetate, and then converting to an alkali metal salt. The maleic acid half ester can be obtained by reacting a monohydric alcohol (e.g. methyl alcohol, ethyl alcohol, n-propyl alcohol, isopropyl alcohol, n-butyl alcohol, sec-butyl alcohol, tert-butyl alcohol, n-pentyl alcohol, n-hexyl alcohol, n-octyl alcohol, n-decanol, n-octadecanol, 2-ethylhexyl alcohol, 2,2,2-trichloroethanol, ethoxymethyl alcohol, benzyl alcohol, phenylethyl alcohol, or chlorobenzyl alcohol) with maleic anhydride. Therefore, $R_5$ in the maleic acid half ester structure comes from the monohydric alcohol, in the present invention it is a substituted or unsubstituted alkyl of 1 to 25 carbon atoms or a substituted or unsubstituted aralkyl of 7 to 25 carbon atoms. In view of endowing the paper with a sizing effect, $R_5$ preferably has a greater number (e.g. 3 or more) of carbon atoms, and from the compatibility with polyamide, it has a smaller number (e.g. less than 3) of carbon atoms. Therefore, $R_5$ may be appropriately selected according to the properties required for the produced newsprint paper. However, in view of the cost, $R_5$ is more preferably an alkyl of 1 to 5 carbon atoms. In other words, the maleic acid half ester is preferably monomethyl maleate, monoethyl maleate, mono-n-propyl maleate, mono-isopropyl maleate, mono-n-butyl maleate, mono-sec-butyl maleate, mono-tert-butyl maleate, or mono-n-pentyl maleate.

In the component B used in the present invention, it is basically optimal to set the ratio of vinyl acetate and maleic acid half ester to 1:1, which may be varied to another ratio as far as the basic properties of the compound are not lost. Similarly, the compound may be copolymerized with a small amount of monomers which are copolymerizable with vinyl acetate and/or maleic acid half ester as far as the basic properties of the compound are not lost.

Although it is basically desirable that the individual monomers of the component B used in the present invention are distributed alternately, the distribution depends on the production method, and may be of a block copolymer or a random copolymer.

The component B used in the present invention is superior in compatibility with the component A of Formula (1), which in itself is low in stickiness (that is, high in peeling strength). Therefore, the component B can be readily mixed with the component A, and the mixture has an appropriately low stickiness when mixed in a predetermined ratio. As a result, the surface treating agent of the present invention comprising the component A and the component B is a material which gives the paper well-balanced surface strength and peeling strength.

In the surface treating agent of the present invention which comprises the component A and the component B, the ratio (B/A) is important which is in the range of 3/97≦B/A≦20/80. If B/A is smaller than 3/97, since the amount of the component B is insufficient, a sufficient peeling strength (for example, about less than 2.2 g/cm in the peeling test of the Example) cannot be obtained. Further, since the coating amount is very small in the newsprint paper of the present invention, when B/A is larger than 20/80, the amount of the component A is insufficient, and a sufficient surface strength (for example, less than about 25 in the number of fluffs in the surface strength test in the Example) cannot be obtained. In view of well-balanced surface strength and peeling strength, 5/95≦B/A≦10/90 is preferable.

The surface treating agent of the present invention may basically comprise only the component A and the component B, and a binder component is not necessarily required. However, another binder component may be used as far as no problem occurs in the present invention. As another binder component, starches such as starch, modified starch (ammonium persulfate (APS)-modified starch, enzyme-modified starch, and the like), alpha starch, oxidized starch, starch derivatives (ester starch (acetylated starch, phosphate ester starch, and the like), ester starch (methylated starch, hydroxyethylated starch and the like), cross-linked starch), and grafted starch); celluloses such as methylcellulose, ethylcellulose, and carboxymethylcellulose; latexes such as styrene/butadiene copolymer, styrene/acrylonitrile copolymer, and styrene/butadiene/acrylic ester copolymer; polyvinyl alcohols such as completely hydrolyzed polyvinyl alcohol, partially hydrolyzed polyvinyl alcohol, amide-modified polyvinyl alcohol, carboxy-modified polyvinyl alcohol, and sulfonic acid-modified polyvinyl alcohol; and various resins such as silicone resin, petroleum resin, terpene resin, ketone resin, and coumarone resin can be used. Of these components, those having a water solubility are required to have a water resistance as possible when coated on the paper. In particular, since starches and polyvinyl alcohols, when coated on the paper, tend to increase the stickiness of the paper in wetting, care should be used on the amount combined.

Further, the surface treating agent of the present invention may be combined with additives and fillers such as antiseptic, defoamer, ultraviolet-proof agent, fluorescent whitening agent, and clay stabilizer as far as no problem occurs in the present invention.

The newsprint base paper used in the present invention is produced from mechanical pulps (MP) such as ground pulp (GP), thermomechanical pulp (TMP), and semi-mechanical pulp, and deinked pulp (DIP) obtained by deinking waste paper of newspaper and magazines including these pulps, recovered pulp obtained by defibering broke paper from the sheeting process, and chemical pulp (CP) represented by kraft pulp (KP), which, alone or mixed in an appropriate ratio, are sheeted to a substance of less than 46 $g/m^2$. Since the base paper with a substance of more than 46 $g/m^2$ is high in content of pulp fibers, it does not require addition of large amounts of fillers and pigments to ensure opacity of the paper and for preventing penetration of ink to the backside. Therefore, it is considered to have a sufficient surface strength, and dimensional changes or reduction in strength due to wetting during offset printing can be neglected. Therefore, it is not necessarily required to be coated with the surface treating agent. Further, the content of DIP can be flexibly (0 to 100%) adjusted. From the recent trend towards high DIP content, a DIP content of 30–70% is more preferable.

Further, as necessary, the newsprint base paper may contain paper-making fillers such as white carbon, clay, silica, talc, titanium oxide, calcium carbonate, synthetic resins (polyvinychloride resin, polystyrene resin, urea-formaldehyde resin, melamine resin, styrene/butadiene copolymer resin, and the like); paper strength agents such as polyacrylamide-type polymer, polyvinyl alcohol-type polymer, cationic starch, urea/formaldehyde resin, and melamine/formaldehyde resin; freeness/yield improvers such as acrylamide/aminomethylacrylamide copolymer salt, cationic starch, polyethyleneimine, polyethyleneoxide, and acrylamide/sodium acrylate copolymer; sizing agents such as strengthened rosin sizing agent (maleic anhydride or fumaric anhydride is added to rosin to obtain partially maleated or fumarated rosin, which is saponified with an alkali to a solution), emulsion sizing agent (partially maleated or fumarated rosin is dispersed in water using rosin soap or various surfactants), synthetic sizing agent (sizing agent using petroleum resin obtained by copolymerizing $C_3$–$C_{10}$ fractions of naphtha), and reactive sizing agent (AKD, alkenylsuccinic anhydride); and auxiliaries such as aluminum sulfate, water resistant agent, ultraviolet-proof agent, and antifading agent. The base paper is required to have physical properties capable of being printed by an offset printing press, and may have physical properties such as tensile strength, tear strength, and elongation same as those of general-purpose newsprint paper.

The newsprint paper of the present invention is produced by externally adding the surface treating agent comprising the component A and the component B on one side or both sides of the newsprint base paper by a coater.

The coating amount of the surface treating agent of the present invention is preferably 0.01 to 0.2 $g/m^2$ based on the solid on one side of the paper. When the coating amount is less than 0.01 $g/m^2$, the surface treating agent is too small in amount and does not contribute to improvement of the surface strength. When the coating amount is more than 0.2 $g/m^2$, contribution to the surface strength is almost unchanged, but a problem of increased stickiness occurs. It is also disadvantageous in view of economy.

The coater includes 2-roll size press, bar coater, air knife coater, gate roll coater, blade rod metering coater, and the like. In view of the cost, these coaters are preferably of an on-machine type. Of these coaters, in transfer-type coaters such as gate roll coater, blade rod metering coater, and the like, in coating the coating color corresponding to the desired coating amount is transferred as a film of a predetermined thickness to the paper. Therefore, there is no excessive coating color in the transfer, nor extra coating color penetrate in the paper. As a result, the coating color can be coated on the surface of paper very efficiently. As described above, in the newsprint paper of the present invention, since the coating amount is small, it is effective to use a transfer-type coater (in particular, gate roll coater, and blade rod metering coater). Using the transfer-type coater, the surface treating agent readily retains on the surface of the base paper, and an improved surface strength and a desirable peeling strength can be obtained even with a low coating amount. In view of maintenance of the coater, use of the gate roll coater is the most preferable for the newsprint paper of the present invention.

Further, the surface treating agent of the present invention is also superior in adaptability to gate roll. That is, the newsprint paper of the present invention may be produced by externally adding the surface treating agent comprising the component A and the component B on one side or both sides of the newsprint base paper by a gate roll coater.

A newsprint paper with improved surface strength is obtained by coating the surface treating agent comprising the component A and the component B to a coating amount of 0.01 to 0.2 $g/m^2$ on the newsprint base paper with a substance of less than 46 $g/m^2$. Reason for this has yet to be elucidated.

Since, in general, newsprint base paper contains large amounts of mechanical pulp, it is very high in water absorptivity. Therefore, coating color such as the surface treating agent is liable to penetrate into the paper, and it is difficult to evenly coat a small coating amount.

However, the polyacrylamide-based compound of the present invention has a low molecular weight of 50,000 to 1,500,000, thereby enhancing the activity of the amide group in the molecule. Further, by introducing the methylol structure and the acrylic acid (salt) structure, it is liable to form links to each other between molecules of the polyacrylamide-based compound or between the polyacrylamide-based compound and pulp fibers. Therefore, it is considered that the polyacrylamide-based compound of the present invention is very good in retention on the base paper surface.

Further, it is considered that by coating the surface treating agent of the present invention using a gate roll coater or the like, the surface of the base paper can be evenly covered even with a very low coating amount.

The vinyl acetate/maleic acid half ester copolymer is also liable to retain on the base paper surface due to the maleic acid half ester structure and the like. The copolymer largely contributes to improvement of the peeling strength, and in itself contributes to improvement of the surface strength, which is considered to be one of the reasons of the effect with the small coating amount.

DETAILED DESCRIPTION OF EXAMPLES

In the following description, part indicates part by weight.

<Production of newsprint base paper>

Mixed pulp obtained by mixing and defibering 35 parts of DIP, 30 parts of TMP, and 15 parts of KP and adjusting the freeness to 200 was sheeted by a Berbeformer type paper machine at a sheeting speed of 1,000 m/min to obtain an unsized, uncalendered newsprint base paper with a substance of 43 $g/m^2$.

<Preparation of polyacrylamide-based compound>

Polyacrylamide-based compounds (A-1 to A-12) were produced by a method in which polyacrylamide was hydrolyzed and partially methylolated (for example, Synthesis Example 1), or N-methylol acrylamide, acrylamide, and acrylic acid/acrylic acid salt are copolymerized (for example, Synthesis Example 2). These polymers were used at solid contents of about 15–22% in Examples and Comparative Examples.

Synthesis Example 1 (preparation of polymer A-1)

An aqueous polyacrylamide solution was hydrolyzed at 80° C. using aqueous potassium hydroxide solution which hydrolyzes 10% of the acrylamide units. The reaction solution was then methylolated at 50° C. using formaldehyde in an amount for methylolating 5% of acrylamide units of the polyacrylamide, and pH value adjusted to 7.0 to obtain polymer A-1. (Molecular weight=100,000)

Synthesis Example 2 (preparation of polymer A-2)

Acrylamide in an amount of V5 mole %, 20 mole % of sodium acrylate, and 5 mole % of N-methylol acrylamide were polymerized in aqueous solution at 80° C. in the presence of ammonium persulfate and sodium bisulfite according to a conventional method known in the art to obtain polymer A-2. (Molecular weight=200,000)

Synthesis Example 3 (preparation of polymer A-3)

Acrylamide in an amount of 75 mole %, 10 mole % of potassium acrylate, and 15 mole % of N-methylol acrylamide were polymerized in aqueous solution at 80° C. in the presence of ammonium persulfate and sodium bisulfite according to a conventional method known in the art to obtain polymer A-3. (Molecular weight=1,500,000)

Synthesis Example 4 (preparation of polymer A-4)

Acrylamide in an amount of 75 mole %, 20 mole % of ammonium acrylate, and 5 mole % of N-methylol acrylamide were polymerized in aqueous solution at 80° C. in the presence of ammonium persulfate and sodium bisulfite according to a conventional method known in the art to obtain polymer A-4. (Molecular weight=650,000)

Synthesis Example 5 (preparation of polymer A-5)

Acrylamide in an amount of 60 mole %, 20 mole % of potassium itaconate, and 20 mole % of N-methylol acrylamide were polymerized in aqueous solution at 80° C. in the presence of ammonium persulfate and sodium bisulfite according to a conventional method known in the art to obtain polymer A-5. (Molecular weight=60,000)

Synthesis Example 6 (preparation of polymer A-6)

An aqueous polymethacrylamide solution was hydrolyzed at 80° C. using aqueous potassium hydroxide solution which hydrolyzes 3% of the methacrylamide units. The resulting polymer (potassium salt) was then converted to tetramethylammonium salt to obtain polymer A-6. (Molecular weight=1,200,000)

Synthesis Example 7 (preparation of polymer A-7)

An aqueous polyacrylamide solution was hydrolyzed at 80° C. using aqueous potassium hydroxide solution which hydrolyzes 10% of the acrylamide units to obtain polymer A-7. (Molecular weight=200,000)

Synthesis Example 8 (preparation of polymer A-8)

Acrylamide in an amount of 85 mole % and 15 mole % of potassium acrylate were polymerized in aqueous solution at 80° C. in the presence of ammonium persulfate and sodium bisulfite according to a conventional method known in the art to obtain polymer A-8. (Molecular weight=400,000)

Synthesis Example 9 (preparation of polymer A-9)

Acrylamide in an amount of 47 mole %, 50 mole % of potassium acrylate, and 3 mole % of N-methylol acrylamide were polymerized in aqueous solution at 80° C. in the presence of ammonium persulfate and sodium bisulfite according to a conventional method known in the art to obtain polymer A-9. (Molecular weight=450,000)

Synthesis Example 10 (preparation of polymer A-10)

Acrylamide in an amount of 60 mole %, 10 mole % of potassium acrylate, and 30 mole % of N-methylol acrylamide were polymerized in aqueous solution at 80° C. in the presence of ammonium persulfate and sodium bisulfite according to a conventional method known in the art to obtain polymer A-10. (Molecular weight MW=500,000)

Synthesis Example 11 (preparation of polymer A-11)

Acrylamide in an amount of 70 mole % and 30 mole % of N-methylol acrylamide were polymerized in aqueous solution at 80° C. in the presence of ammonium persulfate and sodium bisulfite according to a conventional method known in the art to obtain polymer A-11. (Molecular weight MW=900,000)

Synthesis Example 12 (preparation of polymer A-12)

Acrylamide alone was polymerized at 80° C. according to a conventional method known in the art to obtain polymer A-12. (Molecular weight MW=1,500,000)

Synthesis Example 13 (preparation of polymer A-13)

Polymer A-13 was prepared by the use of the method in Synthesis Example 1 from a polyacrylamide which has a lower molecular weight than that of Synthesis Example 1. (Molecular weight=30,000)

Synthesis Example 14 (preparation of polymer A-14)

Polymer A-14 was prepared using the method in Synthesis Example 1 from a polyacrylamide which has a higher molecular weight than that of synthesis Example 1. (Molecular weight=3,200,000)

Synthesis Example 15 (preparation of polymer A-15)

Acrylamide in an amount of 50 mole %, 20 mole % of sodium acrylate, and 30 mole % of N-Methylol acrylamide were polymerized in aqueous solution at 80° C. in the presence of ammonium persulfate and sodium bisulfite according to a conventional method to obtain polymer A-15. ((Molecular weight=220,000)

Ratios of ingredients of the prepared polyacrylamide-based compounds are summarized in Table 1.

TABLE 1

| Synthesis Example No. | Polymer | Ratio of ingredients (%) X | Y | Z | Acrylic acid salt type |
|---|---|---|---|---|---|
| Synthesis Example 1 | A-1 | 5 | 85 | 10 | Potassium salt |
| Synthesis Example 2 | A-2 | 5 | 75 | 20 | Sodium salt |
| Synthesis Example 3 | A-3 | 15 | 75 | 10 | Potassium salt |
| Synthesis Example 4 | A-4 | 20 | 75 | 5 | Ammonium salt |
| Synthesis Example 5 | A-5 | 20 | 60 | 20 | Sodium salt |
| Synthesis Example 6 | A-6 | 0 | 97 | 3 | Tetramethyl-ammonium salt |
| Synthesis Example 7 | A-7 | 0 | 90 | 10 | Potassium salt |
| Synthesis Example 8 | A-8 | 0 | 85 | 15 | Potassium salt |
| Synthesis Example 9 | A-9 | 50 | 47 | 3 | Potassium salt |
| Synthesis Example 10 | A-10 | 10 | 60 | 30 | Sodium salt |
| Synthesis Example 11 | A-11 | 30 | 70 | 0 | — |
| Synthesis Example 12 | A-12 | 0 | 100 | 0 | — |
| Synthesis Example 13 | A-13 | 5 | 85 | 10 | Potassium salt |
| Synthesis Example 14 | A-14 | 5 | 85 | 10 | Potassium salt |
| Synthesis Example 15 | A-15 | 30 | 50 | 20 | Sodium salt |

<Preparation of vinyl acetate/maleic acid half ester copolymer>

The obtained copolymer was used at a solid content of about 20% in Examples and Comparative Examples.

Synthesis Example 16 (preparation of polymer B-1)

Vinyl acetate (1 equivalent) and mono-iso-propyl maleate (1 equivalent) were polymerized in the presence of benzoyl peroxide according to a conventional method known in the art, and then converted to potassium salt using potassium hydroxide to obtain polymer B-1.

Synthesis Example 17 (preparation of polymer B-2)

Vinyl acetate (1 equivalent) and mono-n-butyl maleate (1 equivalent) were polymerized in the presence of benzoyl peroxide according to a conventional method known in the art, and then converted to sodium salt using sodium hydroxide to obtain polymer B-2.

Synthesis Example 18 (preparation of polymer B-3)

Vinyl acetate (1 equivalent) and mono-n-benzyl maleate (1 equivalent) were polymerized in the presence of benzoyl peroxide according to a conventional method known in the art, and then converted to potassium salt using potassium hydroxide to obtain polymer B-3.

<Production of newsprint paper>

Examples 1–28

The solutions of polyacrylamide-based compounds (component A) prepared in Synthesis Examples 1–8 and the vinyl acetate/maleic acid half ester copolymers (component B) prepared in Synthesis Examples 16–17 were mixed to prepare coating solutions so that the weight ratio (A:B) of solids was 97:3 to 80:20 and the solid content was 3–4%. The coating solution was coated on one side of the newsprint base paper by a gate roll coater to a coating amount of 0.01 to 0.20 $g/m^2$. After coating, the paper was supercalendered to obtain newsprint paper (Tables 2 and 3).

Comparative Examples 1–8, 21–23

The solutions of polyacrylamide-based compounds (component A) prepared in Synthesis Examples 9–15 and the vinyl acetate/maleic acid half ester copolymers (component B) prepared in Synthesis Examples 16–17 were mixed to prepare coating solutions so that the weight ratio (A:B) of solids was 97:3 to 80:20 and the solid content was 3–4%. The coating solution was coated on one side of the newsprint base paper by a gate roll coater. After coating, the paper was supercalendered to obtain comparative samples of newsprint paper (Table 4).

Comparative Examples 9–16

The solutions of polyacrylamide-based compounds (component A) prepared in Synthesis Examples 1–8 and the vinyl acetate/maleic acid half ester copolymers (component B) prepared in Synthesis Examples 16–17 were mixed to prepare coating solutions so that the weight ratio (A:B) of solids was 97:3 to 80:20 and the solid content was 3–4%. The coating solution was coated on one side of the newsprint base paper by a gate roll coater to a coating amount of 0.01 to 0.20 $g/m^2$. After coating, the paper was supercalendered to obtain comparative samples of newsprint paper (Table 5).

Comparative Examples 17–20

The solutions of polyacrylamide-based compounds (component A) prepared in Synthesis Examples 1–8 and the vinyl acetate/maleic acid half ester copolymers (component B) prepared in Synthesis Examples 16–17 were mixed to prepare coating solutions so that the weight ratio (A:B) of solids was 97:3 to 80:20 and the solid content was 3–4%. The coating solution was coated on one side of the newsprint base paper by a gate roll coater to a coating amount of 0.01 to 0.20 $g/m^2$. After coating, the paper was supercalendered to obtain comparative samples of newsprint paper (Table 5).

The newsprint paper of Examples 1–28 and Comparative Examples 1–23 was evaluated for coating amount, surface strength, peeling strength, and stability of coating solution. The evaluation test results are shown in Tables 2–5.

Measurement of coating amount: The newsprint paper is cut, put in a decomposition tube, concentrated sulfuric acid is added and allowed to stand for several minutes. Aqueous hydrogen peroxide solution and decomposition agent are added, and heated to decompose. After the reaction solution is diluted to a predetermined concentration, nitrogen content is determined using a Kjeldahl analysis apparatus. Coating amount is calculated from the nitrogen content.

Measurement of surface strength: In general, surface strength is measured by a method using a Denison wax specified in JIS P8129, and the like. However, unlike general-purpose print paper, it has been difficult to evaluate the surface strength of lightweight newsprint paper (especially that for offset printing). In the present invention, surface strength is evaluated by FRT (Fiber rising test). Specifically, newsprint paper is cut to 300 mm×35 mm wide in the machine direction, and the number of fluffs longer than 0.1 mm per a unit area (1 $m^2$) is determined using a surface analyzer. FIBR 1000 (Fibro system AB). The smaller the value, the better the surface strength. The newsprint paper of the present invention has less than 25 in the number of fluffs per 1 $m^2$.

Measurement of peeling strength: Newsprint paper is cut to two pieces of 4×6 cm, after the coated surfaces are dipped in water at 20° C. for 5 seconds, the coated surfaces are put into close contact. The newsprint base paper is overlapped on the both outside surfaces, passed between rolls at a pressure of 50 kg/$cm^2$, and moisture is adjusted in 60% RH for 24 hours. The test specimens are cut to 3×6 cm, and tested for peeling strength by a traction tester at a traction speed of 30 mm/min. The greater the value, the more difficult the paper to peel (in other words, higher in stickiness). The newsprint paper of the present invention has a peeling strength of less than 2.2 g/cm.

Stability of coating solution: Stability of the coating solution is evaluated by visual observation of the transparency when the coating solutions of Examples or Comparative Examples are stored for 1 day at room temperature. The evaluation criteria are as follows.

Very good: No turbidity occurs.

Good: Slight turbidity is noted.

Fair: Slight precipitation is noted.

Poor: Considerable precipitation is noted.

TABLE 2

| Example No. | Component A | Component B | Ratio of component A and component B (A):(B) | Coating amount (g/m2) | Surface strength (piece) | Peeling strength (g/cm) | Stability of coating solution |
|---|---|---|---|---|---|---|---|
| Example 1 | A-1 | B-1 | 95:5 | 0.07 | 21 | 1.6 | Very good |
| Example 2 | A-1 | B-1 | 95:5 | 0.12 | 19 | 1.9 | Very good |
| Example 3 | A-1 | B-1 | 95:5 | 0.18 | 17 | 2.0 | Very good |
| Example 4 | A-1 | B-1 | 90:10 | 0.06 | 22 | 1.5 | Very good |
| Example 5 | A-1 | B-1 | 90:10 | 0.14 | 18 | 1.9 | Very good |
| Example 6 | A-1 | B-1 | 85:15 | 0.06 | 20 | 1.3 | Very good |
| Example 7 | A-1 | B-1 | 85:15 | 0.19 | 17 | 2.0 | Very good |
| Example 8 | A-1 | B-1 | 80:20 | 0.08 | 23 | 1.4 | Very good |
| Example 9 | A-1 | B-1 | 80:20 | 0.13 | 20 | 1.7 | Very good |
| Example 10 | A-2 | B-2 | 90:10 | 0.04 | 19 | 1.2 | Very good |
| Example 11 | A-2 | B-2 | 90:10 | 0.11 | 17 | 1.5 | Very good |
| Example 12 | A-2 | B-2 | 90:10 | 0.19 | 16 | 2.0 | Very good |
| Example 13 | A-2 | B-3 | 97:3 | 0.02 | 23 | 1.0 | Very good |
| Example 14 | A-2 | B-3 | 97:3 | 0.18 | 18 | 1.8 | Very good |

TABLE 3

| Example No. | Component A | Component B | Ratio of component A and component B (A):(B) | Coating amount (g/m2) | Surface strength (piece) | Peeling strength (g/cm) | Stability of coating solution |
|---|---|---|---|---|---|---|---|
| Example 15 | A-3 | B-1 | 90:10 | 0.08 | 19 | 1.5 | Very good |
| Example 16 | A-3 | B-1 | 90:10 | 0.10 | 19 | 1.6 | Very good |
| Example 17 | A-4 | B-1 | 80:20 | 0.07 | 23 | 1.3 | Very good |
| Example 18 | A-4 | B-1 | 80:20 | 0.16 | 19 | 1.6 | Very good |
| Example 19 | A-5 | B-1 | 95:5 | 0.03 | 23 | 1.1 | Very good |
| Example 20 | A-5 | B-1 | 95:5 | 0.08 | 21 | 1.5 | Very good |
| Example 21 | A-5 | B-1 | 95:5 | 0.17 | 20 | 1.8 | Very good |
| Example 22 | A-6 | B-3 | 85:15 | 0.07 | 19 | 1.4 | Very good |
| Example 23 | A-6 | B-3 | 85:15 | 0.15 | 17 | 1.7 | Very good |
| Example 24 | A-7 | B-1 | 95:5 | 0.02 | 22 | 1.1 | Very good |
| Example 25 | A-7 | B-1 | 95:5 | 0.09 | 17 | 1.3 | Very good |
| Example 26 | A-7 | B-1 | 95:5 | 0.12 | 16 | 1.4 | Very good |
| Example 27 | A-8 | B-1 | 90:10 | 0.13 | 17 | 1.5 | Very good |
| Example 28 | A-8 | B-1 | 90:10 | 0.19 | 16 | 1.9 | Very good |

TABLE 4

| Comparative Example No. | Component A | Component B | Ratio of component A and component B (A):(B) | Coating amount (g/m2) | Surface strength (piece) | Peeling strength (g/cm) | Stability of coating solution |
|---|---|---|---|---|---|---|---|
| Comp. Ex. 1 | A-9 | B-1 | 90:10 | 0.06 | 35 | 1.7 | Poor |
| Comp. Ex. 2 | A-9 | B-1 | 90:10 | 0.11 | 32 | 2.0 | Poor |
| Comp. Ex. 3 | A-10 | B-2 | 95:5 | 0.14 | 30 | 1.9 | Good |
| Comp. Ex. 4 | A-10 | B-2 | 95:5 | 0.27 | 24 | 3.2 | Good |
| Comp. Ex. 5 | A-11 | B-1 | 90:10 | 0.09 | 32 | 1.8 | Fair |
| Comp. Ex. 6 | A-11 | B-1 | 90:10 | 0.21 | 26 | 2.8 | Fair |
| Comp. Ex. 7 | A-12 | B-1 | 90:10 | 0.13 | 30 | 2.0 | Fair |
| Comp. Ex. 8 | A-12 | B-1 | 90:10 | 0.32 | 19 | 3.3 | Fair |

TABLE 5

| Comparative Example No. | Component A | Component B | Ratio of component A and component B (A):(B) | Coating amount (g/m2) | Surface strength (piece) | Peeling strength (g/cm) | Stability of coating solution |
|---|---|---|---|---|---|---|---|
| Comp. Ex. 9 | A-1 | None | 100:0 | 0.02 | 28 | 2.9 | Good |
| Comp. Ex. 10 | A-1 | None | 100:0 | 0.14 | 19 | 6.1 | Good |
| Comp. Ex. 11 | A-8 | B-1 | 99:1 | 0.08 | 20 | 4.3 | Very good |
| Comp. Ex. 12 | A-8 | B-1 | 99:1 | 0.15 | 19 | 5.9 | Very good |
| Comp. Ex. 13 | A-1 | B-1 | 70:30 | 0.09 | 34 | 1.6 | Very good |
| Comp. Ex. 14 | A-1 | B-1 | 70:30 | 0.18 | 31 | 2.0 | Very good |
| Comp. Ex. 15 | A-7 | B-1 | 50:50 | 0.04 | 30 | 1.3 | Good |
| Comp. Ex. 16 | A-7 | B-1 | 50:50 | 0.15 | 28 | 1.5 | Good |
| Comp. Ex. 17 | A-1 | B-1 | 95:5 | 0.28 | 17 | 3.2 | Very good |
| Comp. Ex. 18 | A-1 | B-1 | 95:5 | 0.42 | 17 | 4.5 | Very good |
| Comp. Ex. 19 | A-3 | B-3 | 97:3 | 0.39 | 18 | 5.9 | Very good |
| Comp. Ex. 20 | A-3 | B-3 | 97:3 | 0.66 | 18 | 10.9 | Very good |
| Comp. Ex. 21 | A-13 | B-1 | 90:10 | 0.15 | 30 | 1.8 | Very good |
| Comp. Ex. 22 | A-14 | B-1 | 90:10 | 0.12 | 20 | 3.2 | Very good |
| Comp. Ex. 23 | A-15 | B-2 | 90:10 | 0.13 | 19 | 3.0 | Very good |

Comparative Example 24

Random copolymer of ethyleneoxide and propyleneoxide was added to an aqueous solution of PVA (tradename: K-17, Denki Kagaku Kogyo K.K.) in an amount of 5 parts to 100 parts of PVA to obtain a coating solution. The coating solution was coated on one side of the newsprint base paper by a gate roll coater. After coating, the paper was supercalendered to obtain a comparative sample of newsprint paper. The newsprint paper was evaluation tested, and had a coating amount of 0.19 g/m$^2$, a surface strength of 31, and a peeling strength of 3.4 g/cm.

Comparative Example 25

An aqueous solution having a solid content of 4% of oxidized starch (tradename: SK-20, Nippon Corn Starch Co.) was prepared. The coating solution was coated on one side of the newsprint base paper by a gate roll coater. After coating, the paper was supercalendered to obtain a comparative sample of newsprint paper. The newsprint paper was evaluation tested, and had a coating amount of 0.15 g/m$^2$, a surface strength of 33, and a peeling strength of 3.9 g/cm.

Comparative Example 26

Ammonium perfluorooctoate was added to an aqueous solution of oxidized starch to obtain a coating solution. The coating solution was coated on one side of the newsprint base paper by a gate roll coater. After coating, the paper was supercalendered to obtain a comparative sample of newsprint paper. The newsprint paper was evaluation tested, and had a coating amount of 0.10 g/m$^2$, a surface strength of 35, and a peeling strength of 3.4 g/cm.

Comparative Example 27

The above-described newsprint base paper was evaluation tested, and had a surface strength of 40, and a peeling strength of 0.8 g/cm.

Comparative Example 28

Dodecyl succinic acid—sodium salt was added to polyacrylamide A-1 to obtain a coating solution. The coating solution was tried to be coated on one side of the newsprint base paper by a gate roll coater, but foam was generated remarkably on the pond of this coating solution, and then the coating of it could not be done.

By coating newsprint base paper with the surface treating agent of the present invention comprising a polyacrylamide-based compound (component A) and a vinyl acetate/maleic acid half ester copolymer (component B), a newsprint paper improved in surface strength and peeling strength can be obtained with a small coating amount (0.01 to 0.2 g/m$^2$). As a result, troubles due to surface strength or stickiness, which are problems in offset printing specific to newsprint paper of low substance as used in the present invention, can be prevented, and a newsprint paper can be provided which is very suitable for offset printing. The newsprint paper of the present invention is advantageous in cost because of a small coating amount of the surface treating agent.

What is claimed is:

1. A lightweight newsprint paper comprising a base paper with a substance of less than 46 g/m$^2$ coated thereon with a surface treating agent comprising a polyacrylamide-based compound (component A) of Formula (1) (molecular weight from 50,000 to 1,500,000) and a vinyl acetate/maleic acid half ester copolymer (component B) of Formula (2), characterized in that a ratio of the component A and the component B of said surface treating agent is A:B=97:3 to 80:20, and a coating amount of said surface treating agent is 0.01 to 0.20 g/m$^2$ (per one side):

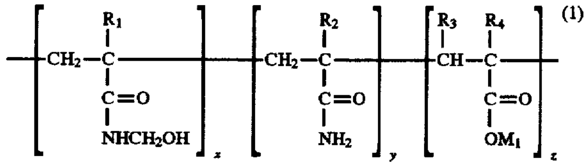
(1)

(wherein $R_1$ and $R_2$ denote methyl group or hydrogen atom. $R_3$ denotes methyl group, hydrogen atom, or —C(=O)$OM_A$, and $R_4$ denotes methyl group, hydrogen atom, or —$CH_2COOM_B$. $M_1$, and $M_A$, and $M_B$ denote hydrogen atom, alkali metal atom, $NH_4$, or a group based on $NH_4$ of which at least one hydrogen atom of the four hydrogen atoms is substituted with a substituted or unsubstituted alkyl of 1 to 20 carbon atoms or a substituted or unsubstituted aryl of 6 to 20 carbon atoms. x, y, and z are integers, wherein $0 \leqq [x/(x+y+z)] \times 100 \leqq 20$ (mole %), $60 \leqq [y/(x+y+z)] \times 100 \leqq 97$ (mole %), and $3 \leqq [z/(x+y+z)] \times 100 \leqq 20$ (mole %).),

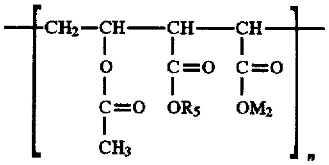
(2)

(wherein $R_5$ denotes a substituted or unsubstituted alkyl group of 1 to 25 carbon atoms or a substituted or unsubstituted aralkyl group of 7 to 25 carbon atoms. $M_2$ denotes hydrogen atom, an alkali metal atom, $NH_4$, or a group based on $NH_4$ of which at least one hydrogen atom of the four hydrogen atoms is substituted with a substituted or unsubstituted alkyl group of 1 to 20 carbon atoms or a substituted or unsubstituted aryl group of 6 to 20 carbon atoms. n is an integer of 2 or more.).

2. The newsprint paper of claim 1, wherein said surface treating agent is coated by a gate roll coater method.

3. The newsprint paper of claim 1, wherein said polyacrylamide-based compound (component A) of Formula (1) has a molecular weight from 50,000 to 500,000.

* * * * *